United States Patent [19]

Todd et al.

[11] Patent Number: 4,565,680

[45] Date of Patent: Jan. 21, 1986

[54] RECOVERY OF PHOSPHORUS AND ALUMINUM FROM SPENT ACID FROM THE BRIGHT-DIP ALUMINUM FINISHING PROCESS

[75] Inventors: Lanny E. Todd; Philip E. Burke; Danny L. Smith, all of Nashville, Tenn.; Carla T. Gleason, Wendell, N.C.

[73] Assignee: Stauffer Chemical Company, Westport, Conn.

[21] Appl. No.: 691,326

[22] Filed: Jan. 14, 1985

[51] Int. Cl.$^4$ .............................................. C01B 25/28
[52] U.S. Cl. .................................. 423/310; 423/313; 423/312; 423/321 R
[58] Field of Search ................... 423/310, 313, 321 R, 423/312

[56] References Cited

U.S. PATENT DOCUMENTS

| | | | |
|---|---|---|---|
| 995,898 | 6/1911 | Peacock | 423/310 |
| 3,667,904 | 6/1972 | Roche et al. | 423/310 |
| 3,974,262 | 8/1976 | Crerar et al. | 423/313 |
| 4,044,106 | 8/1977 | Fang | 423/312 |
| 4,073,635 | 2/1978 | Suppanen | 423/321 R X |
| 4,377,561 | 3/1983 | LaVanture et al. | 423/321 R |

*Primary Examiner*—Patrick P. Garvin
*Attorney, Agent, or Firm*—Vivienne T. White

[57] ABSTRACT

In the process of the invention spent phosphoric acid is concentrated and stripped with air to a greater than 50% $P_2O_5$ concentration to remove nitric acid. As a result of concentrating the spent acid a portion of the aluminum precipitates as monoaluminum phosphate, which is recovered by filtration. The filtrate is then ammoniated to produce a monoammonium phosphate solution. The solids precipitated during ammoniation and comprising aluminum ammonium phosphate which contains other metal phosphates are washed and reacted with aqueous ammonia to form diammonium phosphate.

11 Claims, 1 Drawing Figure

RECOVERY OF PHOSPHORUS AND ALUMINUM FROM SPENT ACID FROM THE BRIGHT-DIP ALUMINUM FINISHING PROCESS

BACKGROUND OF THE INVENTION

1. Field of the Invention

The invention is directed to a method of treating the waste rinse acid from aluminum bright-dipping operations or possibly from wet phosphoric acid processes to produce monoammonium phosphate and other chemicals therefrom.

2. Related Art

Bright-dipping is a commonly used process in industry for chemical polishing of aluminum, and commercial bright-dip operations utilize a solution based mainly on phosphoric acid. In the bright-dip process, phosphoric acid with additives (diammonium phosphate as a fume suppressant and perhaps copper sulfate and/or nickel sulfate) are used by piece and continuous coil aluminum finishers to polish the surface of the aluminum prior to sulfuric acid anodizing. In the bright-dip process, cleaned aluminum parts are immersed in the bath containing phosphoric acid before being transferred to the rinse. With a bright-dip bath, the bath constituents adhere to the parts being polished and are constantly being transferred to the subsequent rinse tank. It is a wasteful process since only 10% to 15% of the purchased phosphoric acid added to the bright-dip bath is actually consumed in chemically polishing the surface of the aluminum. The remainder is lost to the subsequent rinses. In addition to being an expensive operation, commercial bright-dip processing also creates a serious problem in the handling and disposal of the waste liquor because phosphate is one of the more objectionable materials from the standpoint of stream pollution.

Chemical methods for the neutralization and treatment of the rinse acid have been developed, but none of these have achieved widespread acceptance because of the cumbersome equipment required and the high initial cost thereof and the large quantities of treating chemicals consumed. One initial method of recovery widely used employs countercurrent rinsing where sufficient rinse tanks are operated in such a way that water flow is countercurrent to the flow of the parts to control the first rinse acid concentration in the range of 30%–40% $H_3PO_4$. Rinse acid over 30% phosphoric acid is sold directly to liquid fertilizer manufacturers as a raw material but the price is generally low and storage facilities are required due to the seasonal nature of the fertilizer business. A refinement of this recovery for the fertilizer industry is evaporative recovery where the rinse acid is concentrated by evaporation to high strength for resale, for example, 75%. Although the 75% acid requires less storage space and costs less to ship than 30% rinse acid, recovery of 75% acid requires additional capital and operating costs.

Various other techniques have been proposed to recover the rinse acid. For example, a process to recover the phosphoric acid for reuse is that of ion exchange where cation resins exchange hydrogen ions for aluminum and other metal cations in the phosphoric acid, which is then concentrated to the required strength for reuse in the bright-dip bath. The consumption of the regenerent for the ion exchange resin (e.g., sulfuric acid) is high, consequently this technique is not widely utilized.

Another proposed recovery is by adsorption and desorption technique. The principle of the separation is called acid retardation. When a mixture of strong acid and its salts is passed through a column of base and an ion exchange resin in a common ion form, the movement of the acid on the resin bed is retarded (i.e., slows down) relative to the movement of the salt. This technique could theoretically be used to separate aluminum phosphate from the phosphoric acid in the rinse acid and the recovered phosphoric acid could then be concentrated by evaporation for use in the bright-dip bath. Because of the insolubility of aluminum phosphate, $AlPO_4$, in water, free phosphoric acid is required to hold the aluminum phosphate in solution. This not only reduces the efficiency of the recovery but also increases waste disposal problems. The principle advantage of the acid retardation technique compared to the cation exchange method is that the acid can be desorbed from the resin by washing it with plain water. However, this system also requires high capital investment, has high operating and maintenance costs and has not received commercial acceptance.

U.S. Pat. No. 4,044,106 discloses a process for reclaiming phosphate from bright dip rinse acid. The process comprises reacting the acid with soda alkalies to yield trisodium phosphate, sodium aluminate, sodium nitrate and insolubles. The solution is further treated to recover the trisodium phosphate.

U.S. Pat. No. 4,377,561 discloses a process for the clarification of "black" phosphoric acid produced via the wet process by mixing with bright dip rinse acid.

Monoammonium phosphate can be utilized in fire extinguishers and for food uses. Monoaluminum phosphate solutions are utilized as binders in refactories and diammonium phosphate is utilized as a flameproofing agent, in food applications, and in the production of halophosphate phosphors.

SUMMARY OF THE INVENTION

A process is disclosed for recovering phosphorus values from waste aqueous acid solutions generated in aluminum bright-dip operations of the type containing phosphoric acid in combination with appreciable amounts of dissolved aluminum phosphate and nitric acid which comprises the steps of: concentrating and stripping with air the aqueous acid to remove therefrom nitric acid; filtering the concentrated aqueous acid solution to remove therefrom precipated monoaluminum phosphate; then ammoniating the filtrate to produce a monoammonium phosphate solution; recovering the solids from the filtrate and treating the recovered solids containing the remaining phosphate with aqueous ammonia to produce diammonium phosphate.

A BRIEF DESCRIPTION OF THE DRAWING

FIG. 1 is a block diagram illustrating the present invention to produce monoaluminum phosphate, monoammonium phosphate and ammonium phosphate from the bright-dip spent acid.

DETAILED DESCRIPTION OF THE INVENTION

Figure 1:
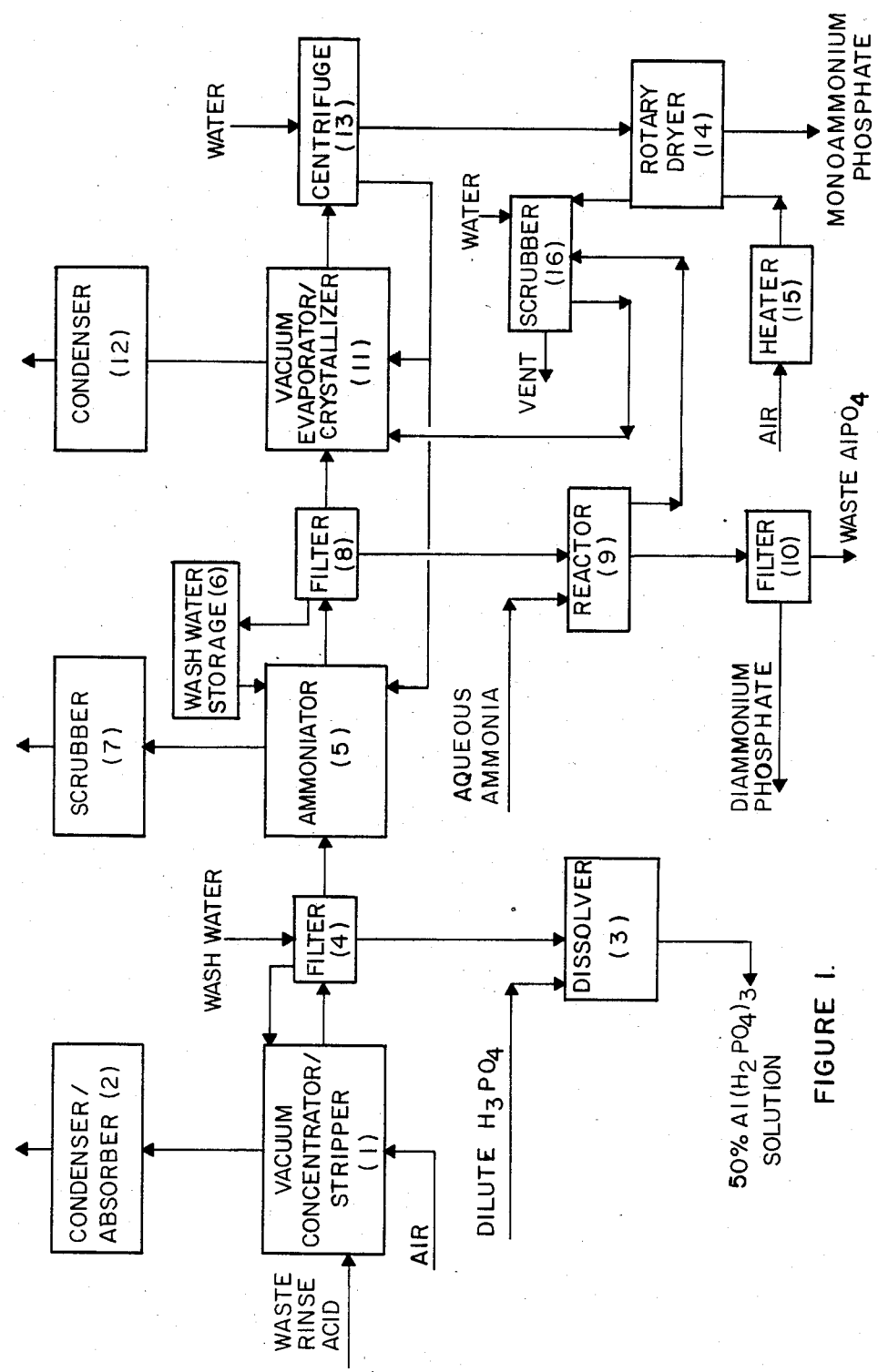

Spent aqueous phosphoric acid comprising about 24% $P_2O_5$ and containing significant quantities of nitric acid, approximately 1% by weight, and aluminum phosphate (about 6% by weight as $AlPO_4$), and trace quantities of other minerals from the aluminum alloy (i.e., zinc, manganese, and magnesium) and corrosion of the equipment (i.e., chromium, nickel and iron) is treated to recover therefrom the phosphoric values as monoammonium phosphate and other phosphate chemicals. The instant process provides a means of recovering approximately 84.2-88.7% of the phosphorus values and about 26-30% of the aluminum contained in the spent aqueous phosphoric acid.

The invention is best described with reference to FIG. 1. In the process the spent phosphoric acid is concentrated and stripped with air in 1. The stripped nitric acid is then conveyed to a condenser-absorber 2. The dilute nitric acid condensed into is neutralized prior to discharge with any base, preferably sodium carbonate, sodium bicarbonate, or sodium hydroxide. In order to remove all of the nitric acid, the spent aqueous acid must be concentrated to above about 50% $P_2O_5$ by weight. At this concentration some of the aluminum in the aqueous acid precipitates as monoaluminum phosphate ($Al(H_2PO_4)_3$) or more correctly ($AlPO_4.2H_3PO_4$). The aqueous phosphoric acid containing the partially precipitated monoaluminum phosphate slurry is then filtered in 4 to remove the solids (monoaluminum phosphate) therefrom. The solids are washed in the filter and discharged to 3, a dissolver. In the dissolver, 3 dilute phosphoric acid is added, and the mixture is heated to about 90° C.-100° C. to put the solids into solution, preferably adjusting as required to produce the 50% commercial concentration of monoaluminum phosphate. The dilute phosphoric acid used generally ranges in strength from 15% to 25% but this range is not limiting. Preferably, a strength of about 25% is used. The filtrate from filter 4 is returned to the stripper and processed until all traces of nitric acid is removed. During this period, dilute phosphoric acid from the washing of the monoaluminmum phosphate is added to the stripper to maintain the $P_2O_5$ concentration in the range of 50-55% until all has been consumed. The stripped filtrate, is then conducted to an ammoniator 5 where it is first diluted to approximately 10%-20% range $P_2O_5$ with water, preferably wash water 6 recovered in the process and stored. The filtrate is then reacted with anhydrous ammonia to increase the pH from less than 1 to about 5.0, preferably 4.5, to form monoammonium phosphate. Any unreacted ammonia is recovered by scrubber 7 through which the ammoniator is vented. The slurry is then filtered in 8 and the monoammonium phosphate solution is fed to a vacuum evaporator crystalizer 11. The filtration solids, primarily aluminum ammonium phosphate ($AlNH_4(HPO_4)_2 \cdot 2.5H_2O$) and other metal phosphates, are washed in situ and discharged into reactor 9. In the reactor the aluminum ammonium phosphate as well as the other metal phosphates are reacted with a solution of aqueous ammonia to form diammonium phosphate in the following reaction sequence:

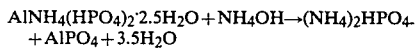
$AlNH_4(HPO_4)_2 \cdot 2.5H_2O + NH_4OH \rightarrow (NH_4)_2HPO_4 + AlPO_4 + 3.5H_2O$ Generally the strength of the aqueous ammonia is from 3% to 18% with 18% being the preferred strength. This range should not, however, be considered as limiting.

The reaction mixture is filtered in 10 to remove solids comprised essentially of aluminum phosphate and other waste solids. The waste solids can be utilized as land fill The diammonium phosphate solution is then crystallized and recovered.

The monoammonium phosphate solution after being conveyed to the vacuum evaporator crystallizer 11 is crystallized and the crystals are separated preferably in a centrifuge 13 and dried preferably as by rotary dryer 14 with a countercurrent stream of air which has been heated in 15° to approximately 60° C. Water and small amounts of ammonia from the evaporator 11 are recovered in a condenser 12 for reuse in the process as in the preparation of aqueous ammonia for use in reactor 9. Gases from the dryer flow to a scrubber 16 where entrained products and ammonia are recovered. The monoammonium phosphate crystals can then be further treated as desired.

The purity of the monoammonium phosphate produced via this process is equivalent to that derived directly from thermal-process $H_3PO_4$ as evidenced by the analytical data in Table 1 below:

TABLE 1

|  | LOT 1* | LOT 2* |
| --- | --- | --- |
| % $P_2O_5$ | 61.27 | 61.07 |
| % $NH_3$ | 14.8 | 14.77 |
| % $Al_2O_3$ | 0.009 | Nil |
| ppm heavy metals (as Pb) | <10 | <10 |
| ppm $As_2O_3$ | 0.1 | 0.2 |
| ppm F | <1.5 | 1.3 |
| % moisture | <0.3 | 0.02 |
| pH of 1% solution | 4.8 | 4.54 |

*Lot 1, 2-monoammonium phosphate recovered in process of invention.

Commercially obtained monoammonium phosphate (obtained from Monsanto Chemical Co.) gave the following analytical results: %$P_2O_5$—61.40; %$NH_3$—14.72;% $Al_2O_3$—Nil; ppm heavy metals—<10; ppm $As_2O_3$—0.2; ppm F—2.0; % moisture—0.03; and pH of 1% solution—4.46.

Phosphoric acid such as that derived from wet processes can be treated as disclosed herein except that stripping the acid to remove nitric acid would not be necessary.

In the examples which follow, spent $H_3PO_3$ from a commercial aluminum finisher was utilized. Analytical data for this rinse acid, which can be considered typical, are presented below:

TABLE 2

| % $P_2O_5$ | 24.15 |
| --- | --- |
| % $Al_2O_3$ | 2.65 |
| % $NH_3$ | 0.17 |
| % $HNO_3$ | 1.05 |
| ppm Cr | 4.9 |
| ppm Cu | 55.2 |
| ppm Fe | 43.4 |
| ppm Ni | 5.6 |
| ppm Mg | 16.9 |
| ppm Mn | 3.7 |
| ppm Zn | 4.8 |

EXAMPLE 1

A 16,048.2 gram amount of spent phosphoric acid from an aluminum finisher employing the bright-dip process (see (Table 2) was treated as discussed below. To a 5-liter Pyrex glass resin reaction flask fitted with an electric heating mantle, an electric motor-driven stirrer fitted with a polytetrafluoroethylene impeller, and a Pyrex glass sparge tube, 5331 grams of this acid were charged. The vessel was vented thru a water-cooled condenser, a gas/condensate separator, and a silica-gel trap to a vacuum pump. Heat was applied, the vessel evacuated, and a 12″–13″ Hg vacuum maintained at the vacuum pump, with additional acid added intermittently to the vessel to maintain the liquid level until all was utilized. Condensate was collected, weighed, and analyzed.

After a total of approximately 21 hours, the $P_2O_5$ concentration had increased to approximately 45.3%. At this point a stream of air was introduced through the sparger to begin the $HNO_3$ stripping process: air flow varied between 1.8 and 3.4 liters/minute. After a total of about 17.5 hours, the $P_2O_5$ concentration had increased to 54.4%, and a suspension of monoaluminum phosphate (MALP)—$Al(H_2PO_4)_3$—crystals was present. At this point heating and stripping were discontinued, and the monoaluminum phosphate crystals were separated from the liquid via pressure filtration. The MALP crystals were washed in situ with deionized water, with the wash liquid set aside. The crystals were either dried in situ with nitrogen or in a convection oven at 50° C.

The filtrate was returned to the 5-liter flask and stripped with air for an additional 17.75 hurs, maintaining a 13″ Hg vacuum at the pump suction and heating the liquid to maintain a temperature between 80° and 110° C. The liquid from washing of the MALP crystals was added intermittently until all had been utilized. Air flow was 8.7 to 11.0 liters per minute. At the conclusion of this process, the nitric acid content had been reduced to below detectable limits, and the acid had $P_2O_5$ and $Al_2O_3$ concentrations of 52.3 and 4.8%, respectively.

By this procedure 12.1% of the $P_2O_5$ contained in the spent $H_3PO_4$ was recovered as monoaluminum phosphate, with the balanced remaining in the $H_3PO_4$/$Al(H_2PO_4)_3$ solution.

Further, 26.3% of the aluminum contained in the spent $H_3PO_4$ was also recovered.

EXAMPLE 2

A 4,222.3 grams of phosphoric acid from Example 1, which had been concentrated and stripped to remove $HNO_3$, were processed in 8 batches of roughly equal size. The acid was diluted to a $P_2O_5$ concentration of approximately 20% and charged to a 2-liter Pyrex glass resin reaction flask equipped with a 316 stainless steel sparge tube and an electric motor-driven propeller type agitator. For the first batch deionized water was used as the diluent; for all subsequent batches wash water from the filtration step described below was utilized. Anhydrous ammonia was introduced via the sparger to the agitated reaction vessel. The reaction vessel was vented to a scrubber containing a glass packing over which dilute $H_2SO_4$ was circulated. At a pH of approximately 2.5, initial precipitation of aluminum and other metal phosphates was observed. Ammoniation was terminated at a pH of 4.5. The slurry was then filtered under vacuum using a Buchner filter funnel and a glass fiber filter pad. The filtrate—a solution of monoammonium phosphate (MAP)—was separated for subsequent crystallization, and the solids washed in situ, with the wash liquor used as a diluent for the next batch. Again in a batchwise fashion under 28″ Hg vacuum in an agitated 5-L reaction flask the MAP liquor was evaporated until a slurry of crystals formed. Heat for evaporation was provided via an electric heating mantle. Crystals were separated from the mother liquor via filtration under vacuum. The crystals, which were not washed, were dried in a convection oven at approximately 50° C. The dried crystals were then screened, with the fraction collected between 10- and 60-mesh retained as product and the fines (−60 mesh) and oversize (+10 mesh) were recycled to the crystallization step. Approximately 10% of the mother liquor from each of the first 10 (of 16 total) crystallization batches was set aside, with the remainder being recycled to the crystallization step. The set-aside mother liquor was combined with phosphoric acid and used in the last two reactor batches.

In the manner outlined above, 2,423.9 grams of monoammonium phosphate (MAP) crystals were produced, and the remaining mother liquor contained an additional 314.0 grams of MAP. Thus, 66.6% of the $P_2O_5$ contained in the spent $H_3PO_4$ was recovered as monoammonium phosphate. No $NH_3$ was found by analysis in the vent scrubber solution. Analytical data for the crystals produced in this experiment are presented in Table 1, designated as Lot 2. Lot 1 was obtained in a similar batch run as described for this Example.

The washed-and-dried solids from this reaction had the following composition:

% $NH_3$ = 6.37
% $Al_2O_3$ = 18.13
% $P_2O_5$ = 50.86
% Loss on ignition = 30.91

Based on the composition above this by-product can be considered to have the empirical formula $NH_4Al(HPO_4)_2 \cdot 2.5H_2O$.

EXAMPLE 3

53.4 grams of $2AlNH_4(HPO_4)_2 \cdot 5H_2O$ from Example 2, which had been dried for analysis and convenience in handling, were slowly (over a period of 24 minutes) added to a beaker containing a solution of aqueous ammonia. The aqueous ammonia was prepared by adding 23.7 grams of reagent-grade $NH_4OH$ having an $NH_3$ content of 28% to 246.6 grams of deionized water. The contents of the beaker were agitated during and subsequent to the addition using a magnetic stirrer and stir bar. At the conclusion of the addition, the pH of the slurry was 8.88. The slurry was heated for 11 minutes to 55° C., during which the pH decreased to 8.04 due to $NH_3$ loss. The slurry was then filtered under vacuum, with sufficient deionized water added to displace liquor from the reaction solids. A 449.0 gram amount of filtrate was recovered, having the following analysis:

% $P_2P_5$ = 2.84
% DAP (calculated from % $P_2O_5$) = 5.29
% $NH_3$ = 1.32
% $Al_2O_3$ = 0.0663

The reaction solids were gelatious in nature and filtration was very slow.

The $P_2O_5$ recover then was:

$$\frac{(449)(0.0284)}{(53.4)(0.5086)}(100) = 46.9\%$$

Thus, 21.3 × 0.469 = 10% of the $P_2O_5$ contained in the spent $H_3PO_4$ is recovered as diammonium phosphate (DAP).

It should be noted that a more concentrated DAP solution can be produced: a dilute concentration was used in this experiment for convenience due to the small quantities involved.

EXAMPLE 4

60.7 grams of $AlNH_4(HPO_4)_2 \cdot 2.5H_2O$ from Example 2 were added over a period of 19 minutes to a beaker containing a solution of aqueous ammonia, prepared by adding 10.8 grams of reagent-grade NH₄OH having an NH₃ concentration of 28% to about 200 ml of deionized water. The contents of the beaker were agitated during and subsequent to the addition using a magnetic stirrer/hot plate and stir bar. At the conclusion of the addition, the pH of the slurry was 9.0. After allowing a period of 10 minutes for reaction, the slurry was heated over a period of 28 minutes to 51° C., with the pH at the end of the heating period being 7.8 due to NH₃ loss. The slurry was then filtered under pressure and the solids washed in situ with sufficient deionized water to displace any remaining reaction liquor. After filtration, 393.8 grams of filtrate were recovered having the following analysis:

% $P_2O_5$ = 2.02
% DAP (calculated from % $P_2O_5$) = 3.76
% $NH_3$ = 0.95
% $Al_2O_3$ = 0.0388

The $P_2O_5$ recovery by this procedure was:

$$\frac{(393.8)(0.0202)}{(60.7)(0.5086)} (100) = 25.8\%$$

Thus, 21.3×0.258=5.5% of the $P_2O_5$ contained in the spent $H_3PO_4$ is recovered as diammonium phosphate (DAP).

What is claimed is:

1. A method for recovering phosphorus values from aqueous phosphoric acid solutions containing phosphoric acid in combination with appreciable amounts of dissolved aluminum phosphate and nitric acid which comprises the steps of concentrating and stripping with air the aqueous acid to remove therefrom nitric acid; filtering the concentrated aqueous acid solution to remove therefrom precipitated monoaluminum phosphate, then ammoniating the filtrate to produce a monoammonium phosphate solution, recovering the solids, then treating the solids with aqueous ammonia to produce diammonium phosphate.

2. The method of claim 1 wherein the stripping is accomplished under vacuum.

3. The method of claim 1 wherein the spent acid is concentrated to from about 50 to about 54% $P_2O_5$ by weight.

4. The method of claim 1 wherein the recovered monoaluminum phosphate is further treated to produce a solution of commercial concentration.

5. The method of claim 4 wherein the further treatment is comprised of heating and dissolution with phosphoric acid.

6. The method of claim 5 wherein a 50% commercial monoaluminum phosphate product is obtained.

7. The method of claim 1 wherein the monoammonium phosphate solution is further treated by crystallization and drying.

8. The method of claim 7 wherein the crystals are dried in a countercurrent stream of air at from about 50° C. to about 60° C.

9. The method of claim 1 wherein the treated solids are $AlNH_4(HPO_4)_2 \cdot 2.5H_2O$.

10. The method of claim 9 wherein the diammonium phosphate is recovered by filtration.

11. The method of claim 10 wherein the diammonium phosphate can be crystallized.

* * * * *

UNITED STATES PATENT AND TRADEMARK OFFICE
CERTIFICATE OF CORRECTION

PATENT NO. : 4,565,680
DATED : January 21, 1986
INVENTOR(S) : L. E. Todd et al.

It is certified that error appears in the above—identified patent and that said Letters Patent is hereby corrected as shown below:

Col. 1, line 68, "regenerent" should read -- regenerant --;

Col. 2, line 12, "the" before "recovered" should read -- this --;

Col. 3, line 68, a period (.) should appear after "land fill";

Col. 4, line 62, the parenthesis "(" should be deleted before "Table";

Col. 5, line 39, the "A" before "4,222.3" should be deleted;

Col. 6, line 47, "$P_2P_5$" should read -- $P_2O_5$ --; and

Col. 6, line 53, "recover" should read -- recovery --.

Signed and Sealed this

Fourth Day of November, 1986

[SEAL]

Attest:

DONALD J. QUIGG

Attesting Officer  Commissioner of Patents and Trademarks